United States Patent
Ellis et al.

(10) Patent No.: US 9,244,652 B1
(45) Date of Patent: Jan. 26, 2016

(54) STATE MANAGEMENT FOR TASK QUEUES

(71) Applicant: The MathWorks, Inc., Natick, MA (US)

(72) Inventors: Edric Ellis, St. Ives (GB); Jocelyn Martin, Burwell (GB); Halldor N. Stefansson, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 202 days.

(21) Appl. No.: 13/964,803

(22) Filed: Aug. 12, 2013

Related U.S. Application Data

(60) Provisional application No. 61/830,397, filed on Jun. 3, 2013.

(51) Int. Cl.
*G06F 15/173* (2006.01)
*G06F 7/06* (2006.01)
*H04L 29/08* (2006.01)

(52) U.S. Cl.
CPC ............ *G06F 7/06* (2013.01); *H04L 29/08135* (2013.01)

(58) Field of Classification Search
USPC ......................................................... 709/224
See application file for complete search history.

(56) References Cited

U.S. PATENT DOCUMENTS

| | | | |
|---|---|---|---|
| 5,881,238 A * | 3/1999 | Aman et al. | 709/226 |
| 6,067,565 A * | 5/2000 | Horvitz | 709/218 |
| 6,088,659 A * | 7/2000 | Kelley et al. | 702/62 |
| 6,988,139 B1 * | 1/2006 | Jervis et al. | 709/226 |
| 6,990,480 B1 * | 1/2006 | Burt | |
| 7,093,259 B2 * | 8/2006 | Pulsipher et al. | 718/106 |
| 7,117,500 B2 * | 10/2006 | Pulsipher et al. | 718/105 |
| 7,222,147 B1 * | 5/2007 | Black et al. | 709/200 |
| 7,756,919 B1 * | 7/2010 | Dean et al. | 709/201 |
| 7,895,431 B2 * | 2/2011 | Bouchard et al. | 713/152 |
| 7,934,216 B2 * | 4/2011 | Taylor et al. | 718/105 |
| 8,438,247 B1 * | 5/2013 | Certain et al. | 709/219 |
| 2002/0124109 A1 * | 9/2002 | Brown | 709/246 |
| 2003/0140172 A1 * | 7/2003 | Woods et al. | 709/248 |
| 2004/0190057 A1 * | 9/2004 | Takahashi et al. | 358/1.15 |

(Continued)

OTHER PUBLICATIONS

HTCondor, "DAGMan", https://research.cs.wisc.edu/htcondor/dagman/dagman.html, 2013, 1 page.

*Primary Examiner* — Michael Y Won
(74) *Attorney, Agent, or Firm* — Harrity & Harrity, LLP

(57) ABSTRACT

A client device may receive information that identifies tasks to be performed by worker devices. The tasks may include at least one task that is to be performed by all worker devices, and may include at least one task that is to be performed by one worker device. The client device may identify, based on the information that identifies the tasks, an order and dependencies associated with performing the tasks. The client device may determine a task, of the tasks, to be performed by a work device, of the worker devices, based on the order and the dependencies. The client device may send, to the worker device, information associated with performing the task, and may receive, from the worker device, an indication that the task has been performed. The client device may determine, based on the order and the dependencies, another task to be performed by the worker device.

20 Claims, 12 Drawing Sheets

(56) References Cited

U.S. PATENT DOCUMENTS

| | | | | |
|---|---|---|---|---|
| 2004/0205217 A1* | 10/2004 | Gabrani et al. | ............... | 709/231 |
| 2006/0129652 A1* | 6/2006 | Petrovskaya | ................. | 709/208 |
| 2008/0235324 A1* | 9/2008 | Abernethy et al. | ........... | 709/201 |
| 2010/0131587 A1* | 5/2010 | Zenz et al. | .................... | 709/203 |
| 2011/0161406 A1* | 6/2011 | Kakeda et al. | ................ | 709/203 |
| 2012/0110087 A1* | 5/2012 | Culver et al. | ................. | 709/205 |
| 2013/0124605 A1* | 5/2013 | Klaka et al. | ................... | 709/203 |
| 2014/0379922 A1* | 12/2014 | XIAO et al. | .................. | 709/226 |

* cited by examiner

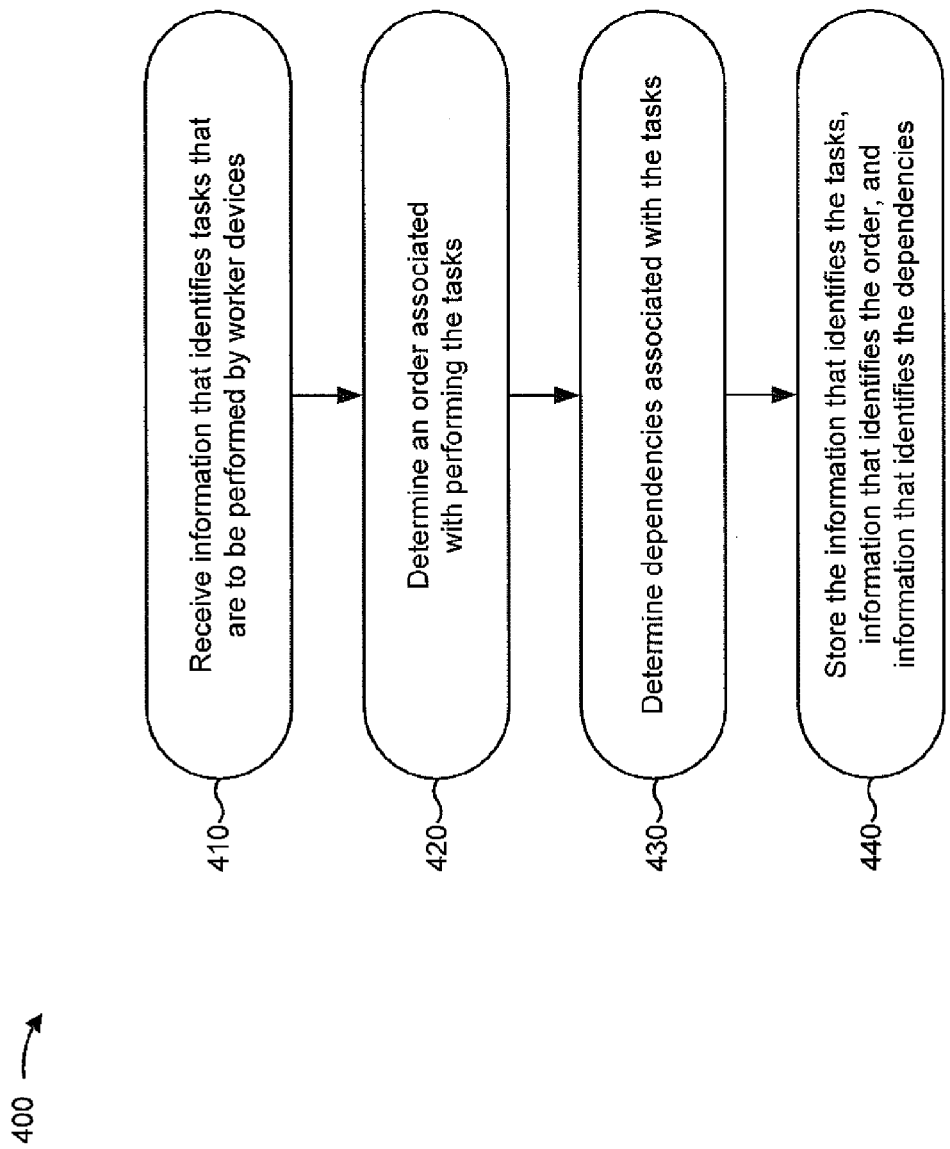

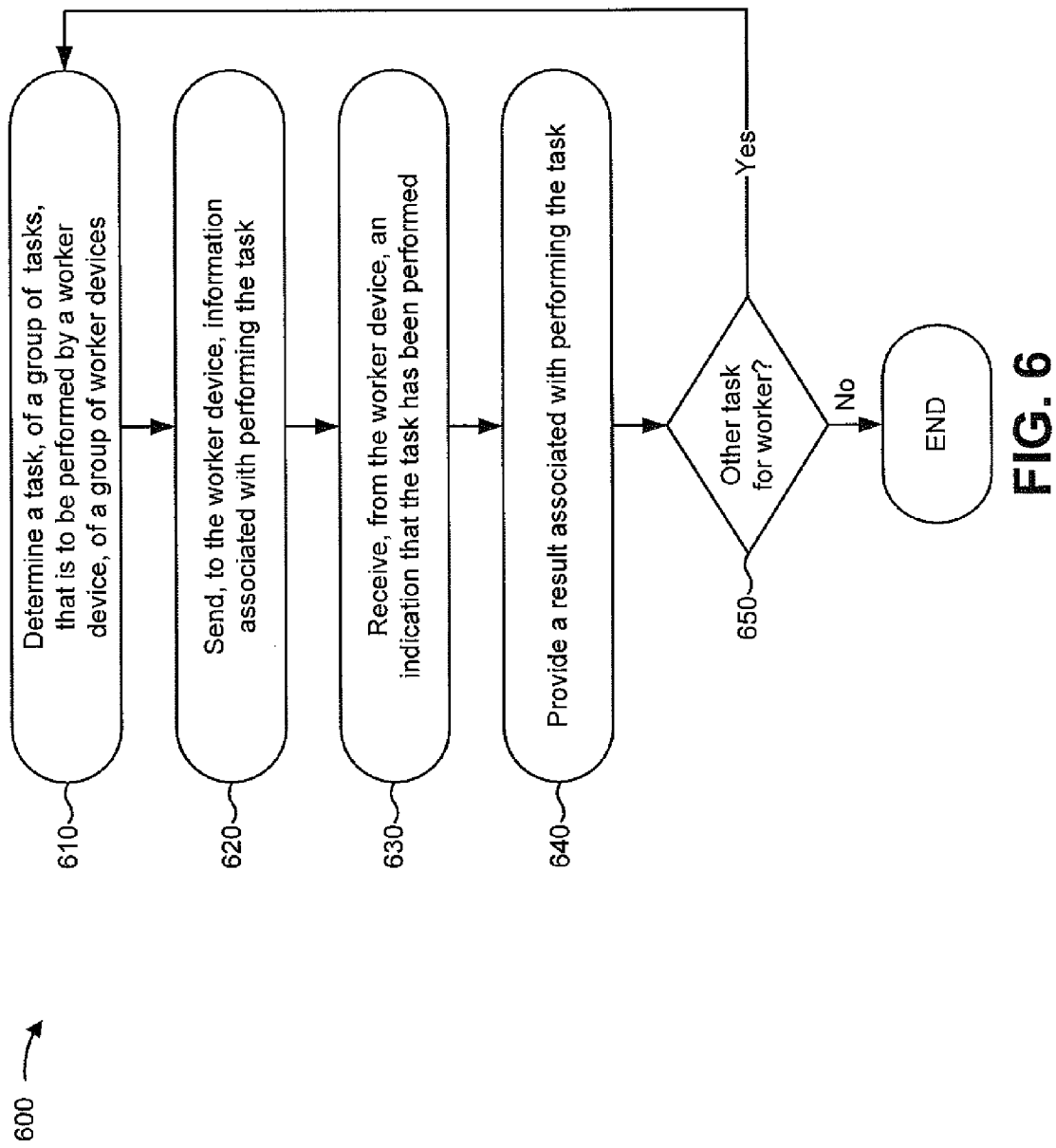

STATE MANAGEMENT FOR TASK QUEUES

RELATED APPLICATION

This application claims priority under 35 U.S.C. §119 based on U.S. Provisional Patent Application No. 61/830,397 filed on Jun. 3, 2013, the content of which is incorporated by reference herein in its entirety.

BRIEF DESCRIPTION OF THE DRAWINGS

FIG. 4 is a flow chart of an example process for determining an order and dependencies associated with tasks that are to be performed by worker devices;

FIG. 6 is a flow chart of an example process for performing tasks; and

DETAILED DESCRIPTION

The following detailed description of example implementations refers to the accompanying drawings. The same reference numbers in different drawings may identify the same or similar elements.

A task queue parallel programming pattern may allow tasks to be performed by worker devices (e.g., processors), where the worker devices are operating as part of a parallel pool. The worker devices may be selected by a device associated with a user (e.g., a client device) during a session by requesting the worker devices from a scheduler or resource manager (e.g., a scheduling device and/or resource management device responsible for scheduling and/or allocating the worker devices to different client devices, processes, tasks, etc.). The worker devices may be allocated for exclusive use by the client device to perform tasks requested by the user.

The parallel pool may be used to perform tasks associated with PARFOR loops (e.g., a parallel FOR loop construct), single process multiple data (SPMD) language constructs (e.g., where a single block of code is executed on all pooled workers concurrently or simultaneously), or the like. However, both PARFOR and SPMD are fully synchronous parallel constructs. In other words, the client device is fully occupied when executing the fully synchronous parallel constructs, and, is not free to run any other program code until the construct is complete.

A user may wish for the client device to execute program code while one or more worker devices are performing one or more tasks (e.g., before a construct is complete). The user may also wish to consume results (e.g., by updating a plot, by updating a user interface element, etc.), associated with the one or more tasks, as the results become available after each task is performed by a worker device. Furthermore, the user may wish to guarantee a particular order and/or a particular dependency associated with the performance of two or more tasks.

Implementations described herein may use a task queue parallel programming pattern that supports two types of evaluations: single function evaluations (e.g., where a task is performed only once by one worker device) and "evaluate on all" function evaluations (e.g., where a task is performed by all worker devices, where a task is performed by all active worker devices in a pool, where a task is performed by all functional worker devices included in a pool, etc.). This programming pattern may allow a client device to execute an asynchronous construct that may allow the client device to execute program code while one or more worker devices are performing one or more tasks. Using this construct, the client device may also guarantee that the one or more tasks are performed in a specified order and in accordance with one or more specified dependencies.

Figure 1A:
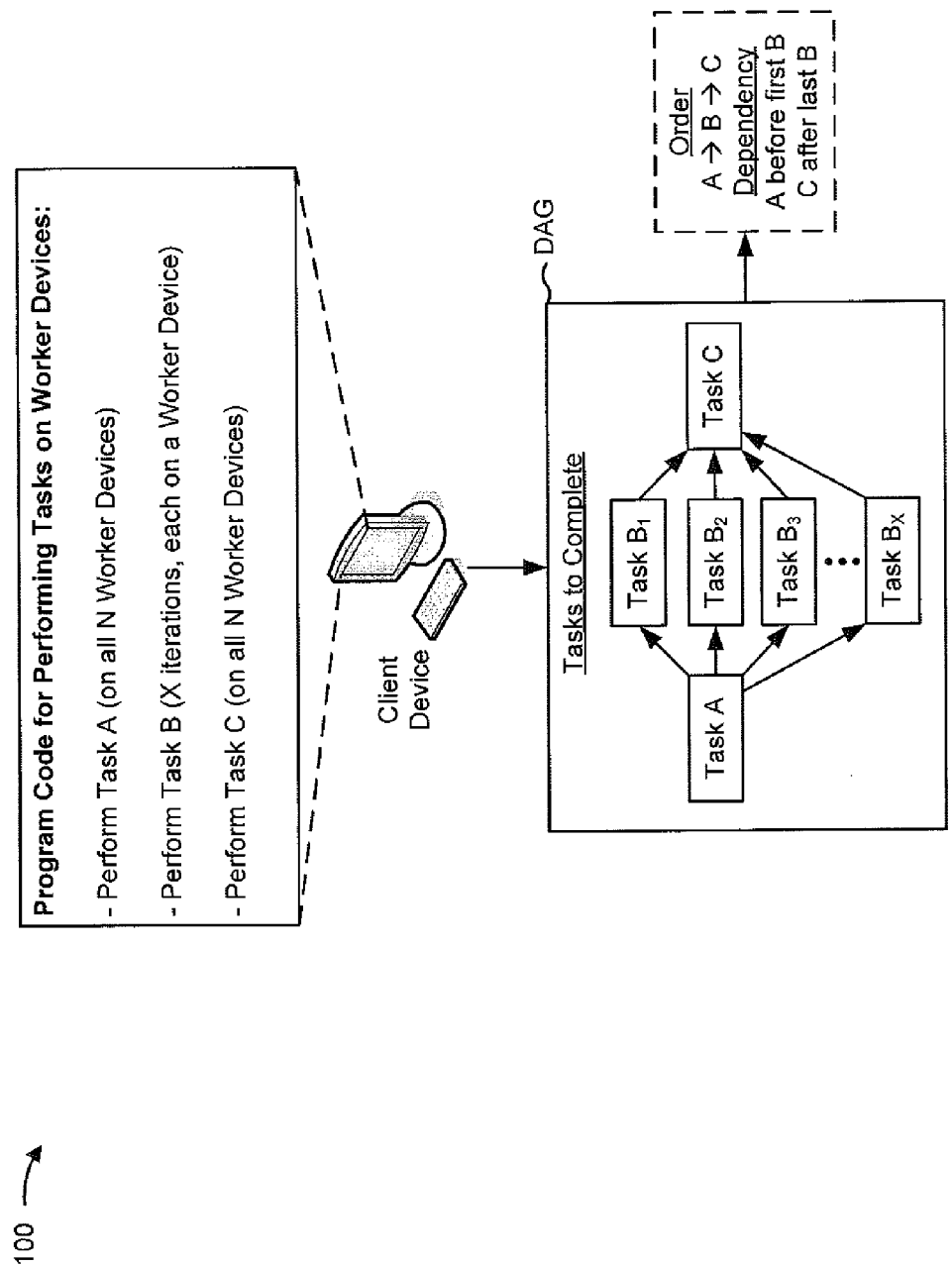
FIGS. 1A and 1B are diagrams of an overview of an example implementation described herein.
Figure 1B:
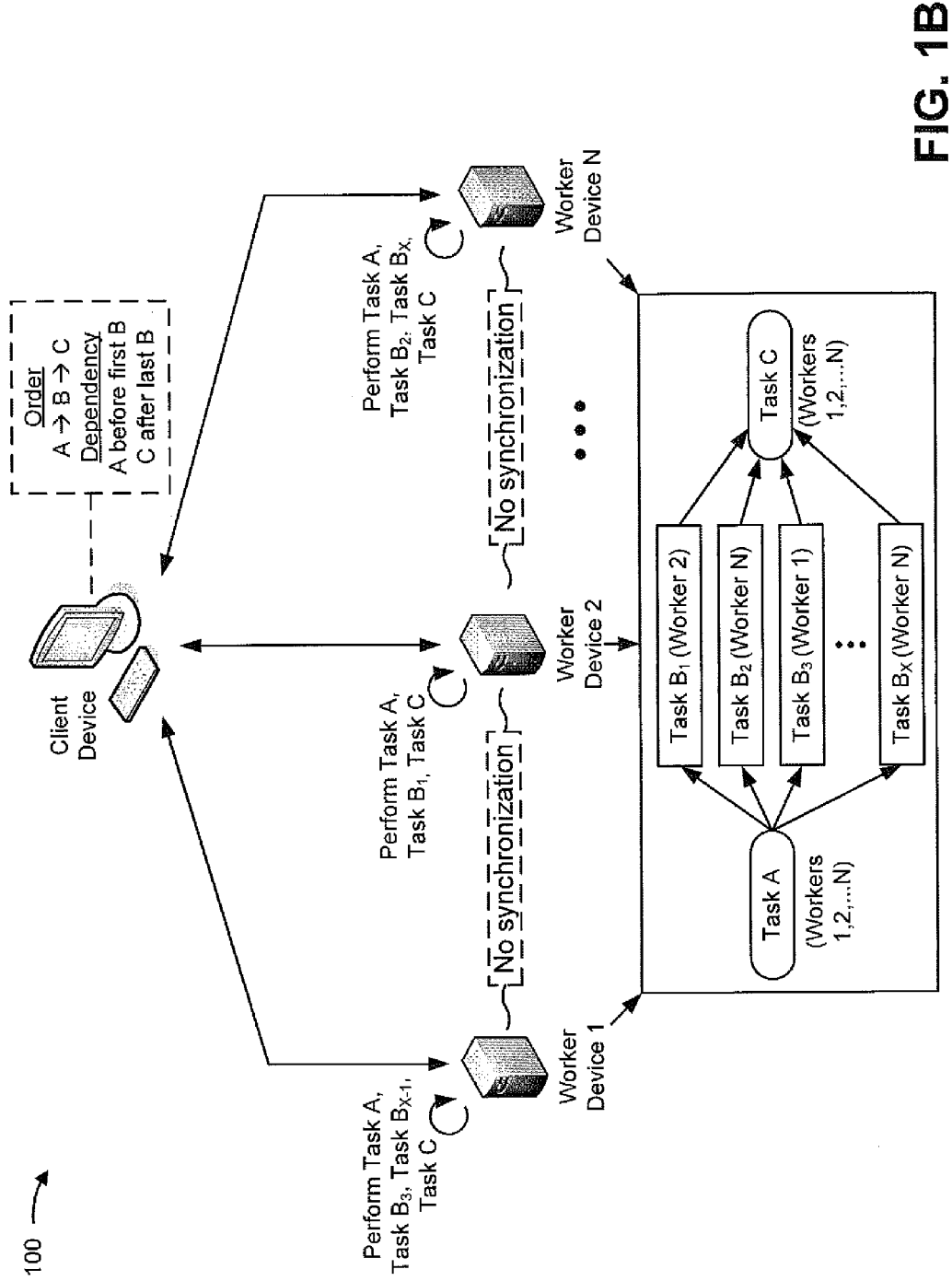

FIGS. 1A and 1B are diagrams of an overview of an example implementation 100 described herein. For the purposes of FIGS. 1A and 1B, assume that a user of a client device wishes for a group of worker devices (e.g., a group of worker devices included in a parallel pool that may be used by the client device) to perform a number of tasks using an asynchronous task queue parallel programming pattern. Further, assume that the user wishes for the tasks to be performed in a particular order, and wishes to specify that certain tasks are dependent on one or more tasks (e.g., a first task must always be performed before an initial iteration of a second task, a third task must be performed after a final iteration of the second task, etc.).

As shown in FIG. 1A, the client device may receive (e.g., via input from the user) program code that identifies three tasks (e.g., Task A, Task B, and Task C) that are to be performed by a group of N worker devices. As shown, the program code may indicate an order (e.g., Task A→Task B→Task C) associated with the three tasks based on the program code. As further shown, the program code may also indicate that Task A is to be performed by a worker device, included in the group of N worker devices, before any iteration of Task B is performed by the worker device (e.g., where a sum total of X iterations of Task B are to be performed by the N worker devices). As further shown, the program code may indicate that Task C is to be performed by a worker device after the worker device performs the final iteration of Task B that is to be performed by the worker device.

As further shown in FIG. 1A, the client device may determine a directed acyclic graph (DAG) based on the program code (e.g., the client device may display the DAG to the user, the client device may store information associated with the DAG, etc.), may execute the program code (e.g., the client device may send the program code to be added to a task queue associated with the group of N worker devices), and or may store the program code for future execution. The client device may also store information associated with the order and the dependencies associated with the tasks.

As shown in FIG. 1B, assume that the group of N worker devices is available to perform the three tasks included in the program code. As further shown, the client device may determine (e.g., based on information stored by the client device) the program code that identifies the three tasks, the order associated with the three tasks, and the dependencies associated with the three tasks.

As further shown, the client device may determine that each worker device, included in the group of N worker devices, is to perform Task A based on the order and the dependency associated with the three tasks. As such, the client device may send information (e.g., program code) associated with performing Task A to each of the N worker devices. As shown, worker device 2 may be the first worker device to finish performing Task A, and may indicate, to the client device, that Task A has been performed. The client device may determine that a first iteration of Task B (e.g., Task $B_1$) is the next task for worker device 2 to perform since worker device 2 was the first worker device to finish performing Task A. The client device may send information associated with performing Task $B_1$ to worker device 2, and worker device 2 may begin performing Task $B_1$.

As further shown in FIG. 1B, worker device N may be the second worker device to finish performing Task A, and may indicate, to the client device, that Task A has been performed. The client device may determine that a second iteration of Task B (e.g., Task $B_2$) is next task for worker device N to perform since worker device N was the second worker device to finish performing Task A. The client device may send information associated with performing Task $B_2$ to worker device N, and worker device N may begin performing Task $B_2$.

As further shown, worker device 1 may be the third worker device to finish performing Task A, and may indicate, to the client device, that Task A has been performed. The client device may determine that a third iteration of Task B (e.g., Task $B_3$) is the next task for worker device 1 to perform since worker device 1 was the third worker device to finish performing Task A. The client device may send information associated with performing Task $B_3$ to worker device 1, and worker device 1 may begin performing Task $B_3$.

As shown, worker device N may finish performing Task $B_2$, and may indicate, to the client device, that Task $B_2$ has been performed. The client device may determine that another iteration of Task B is to be performed by worker device N, and may send information associated with the other iteration of Task B to worker device N. The client device may continue assigning iterations of Task B to each of the N worker devices as each worker device finishes performing an iteration of Task B.

As further shown in FIG. 1B, assume that worker device N is performing a final iteration of Task B (e.g., Task $B_X$). The client device may receive, from worker device 1, an indication that worker device 1 has finished performing an iteration of Task B (e.g., Task $B_{X-1}$). The client device may determine that there are no more iterations of Task B to perform (e.g., since worker device N is performing Task $B_X$), and may determine (e.g., based on the dependency between Tasks B and C) that Task C is to be performed by worker device 1 (e.g., since worker device 1 will not perform any additional iterations of Task B). As shown, the client device may send information, associated with performing Task C to worker device 1, and worker device 1 may perform Task C. As further shown, worker device 1 may finish performing Task C, and the client device may determine that no further tasks are to be performed by worker device 1. The client device may assign Task C to worker devices 2 through N in a similar manner (e.g., after each worker device has finished performing the final iteration of Task B assigned to each worker device).

In this way, a user of client device may provide information identifying tasks, an order associated with the tasks, and dependencies associated with the tasks, and the tasks can be performed asynchronously by a group of worker devices (e.g., no synchronization between the worker devices is required). In this manner, the client device may guarantee that the tasks are performed in a specified manner (e.g., in a particular order, with a particular dependency, etc.) and that the tasks may be efficiently performed by the group of worker devices.

Figure 2:
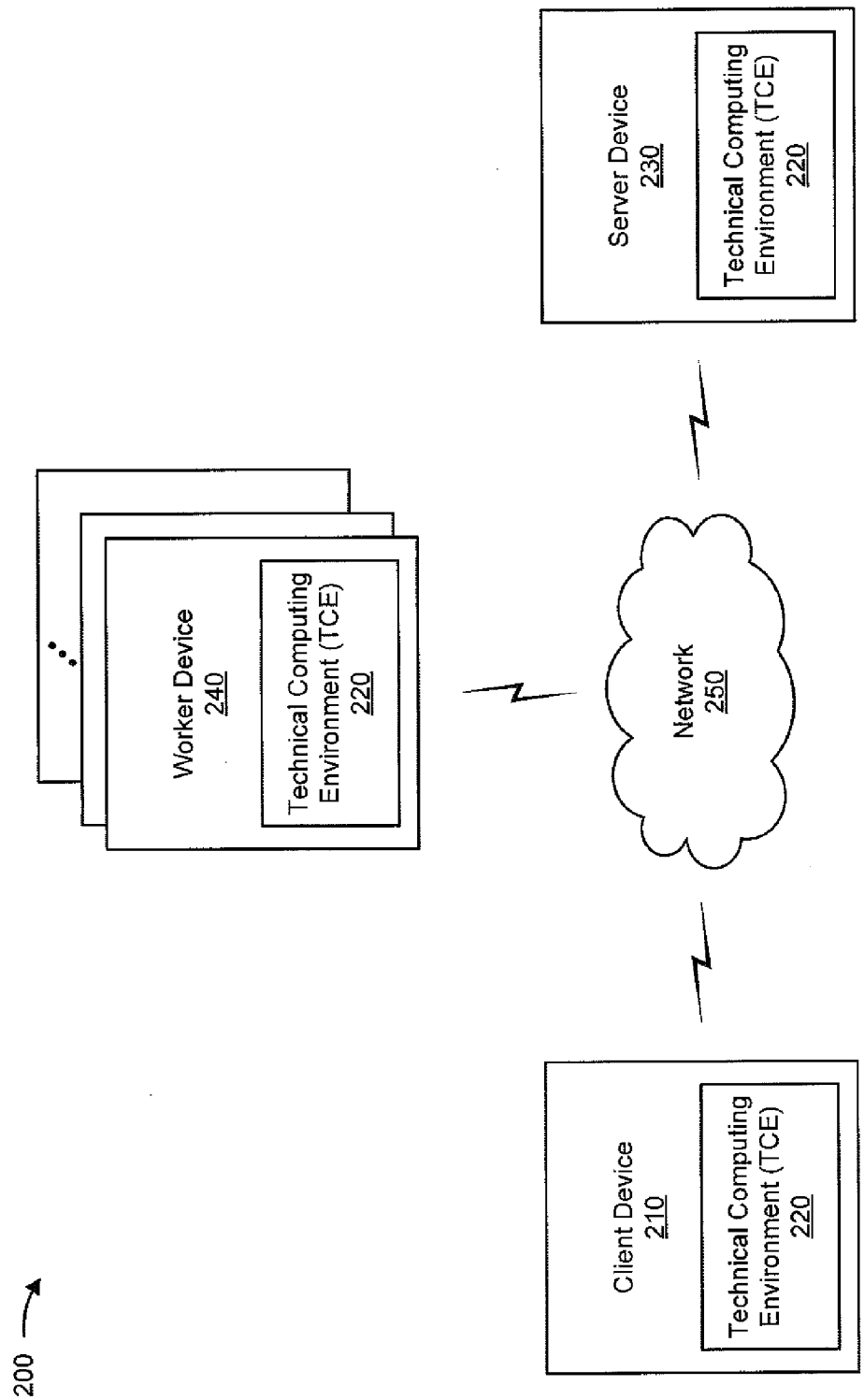
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, a group of worker devices 240, which may include TCE 220, and a network 250. Devices of environment 200 may interconnect via wired connections, wireless connections, or a combination of wired and wireless connections.

Client device 210 may include a device capable of receiving, generating, processing, executing, and/or providing information associated with one or more tasks, such as one or more tasks that are to be performed by worker device 240. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230 and/or worker device 240 (e.g., information associated with one or more tasks).

Client device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; StateWORKS Studio by StateWORKS, etc.), or another type of environment, such as a hybrid environment that may include, for example, a text-based environment and a graphically-based environment.

TCE 220 may include a modeling system that may be used in the creation of a functional model and that may enable generation of executable code based on the model. For example, TCE 220 may include a graphical modeling application that provides a user interface for a computing environment. Additionally, or alternatively, TCE 220 may include a graphical modeling application that provides a user interface for modeling and/or simulating (e.g., by executing a model) a dynamic system (e.g., based on differential equations, difference equations, algebraic equations, discrete events, discrete states, stochastic relations, etc.). A dynamic system (either natural or man-made) may include a system, where a response of the system at any given time may be a function of input stimuli associated with the system, a current state associated with the system, and/or a current time.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice. A block may be hierarchical in that the block itself may comprise one or more blocks that collectively make up the block.

A graphical model (e.g., a functional model) may include entities with relationships between the entities, and the relationships and/or the entities may have attributes associated with them. The entities my include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks connected by lines (e.g., connector lines) that can represent signal values. The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

Server device 230 may include one or more devices capable of receiving, generating, storing, processing, and/or providing information associated with one or more tasks, such as program code associated with one or more tasks. For example, server device 230 may include a computing device, such as a server, a desktop computer, a laptop computer, a tablet computer, a handheld computer, or a similar device. In some implementations, server device 230 may host TCE 220.

Worker device 240 may include one or more devices capable of receiving, storing, performing, processing, and/or providing information associated with one or more tasks provided by client device 210. For example, worker device 240 may include a computing device, such as a server, a desktop computer, a laptop computer, a tablet computer, a handheld computer, or a similar device. In some implementations, worker device 240 may correspond to a processor, multiple processors, a particular type of processor, a processing core, multiple processing cores, a virtual machine, or another similar type of device. In some implementations, worker device 240 may include a remotely located client device 210 running TCE 220 and/or may include a remotely located server device 230 running TCE 220. In some implementations, worker device 240 may be a virtual instance of TCE 220 running on a processing device, such as server device 230, alone or in combination with other instances of worker devices.

Network 250 may include one or more wired and/or wireless networks. For example, network 250 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
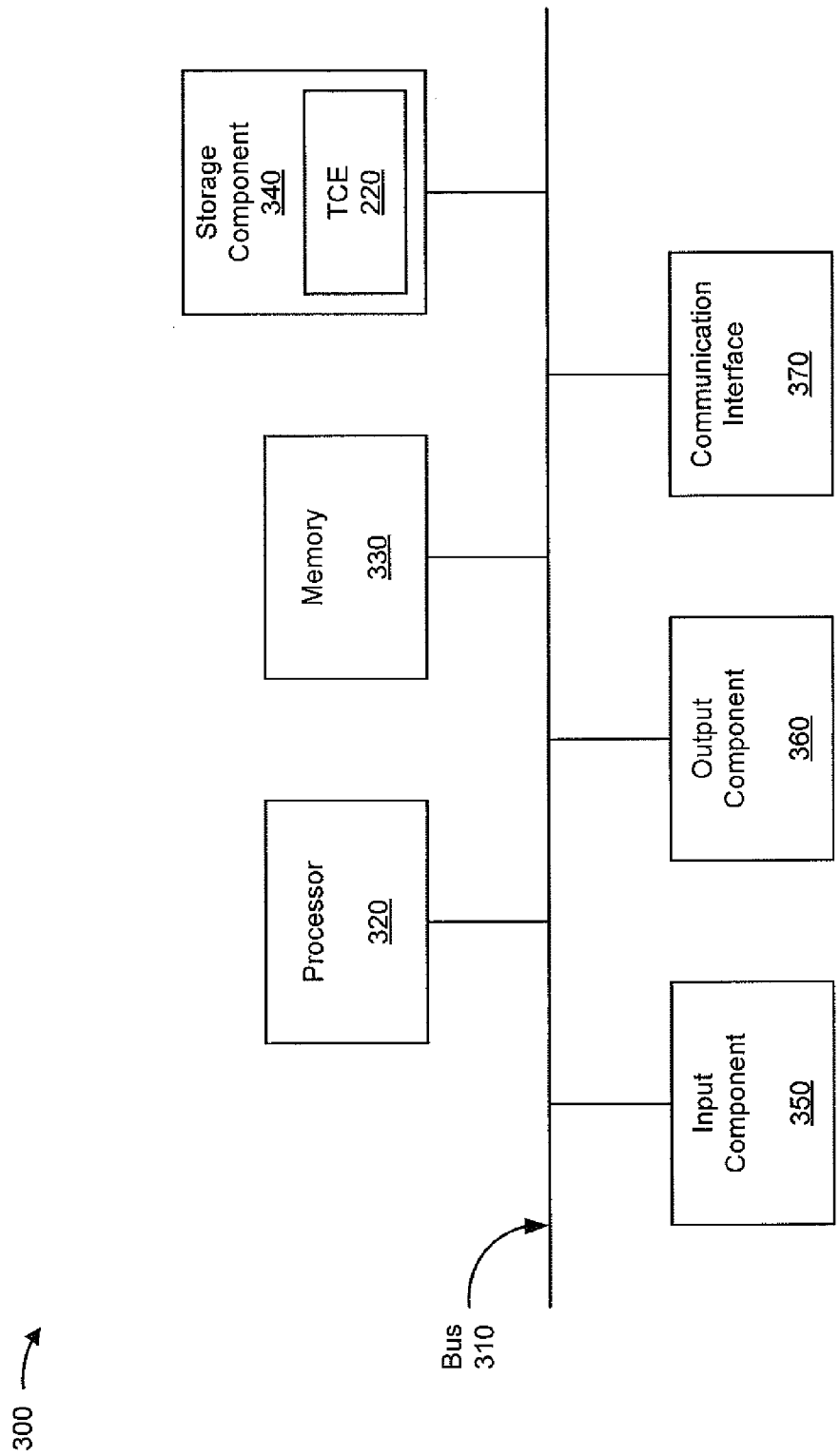
FIG. 3 is a diagram of example components of one or more devices of FIG. 2.

FIG. 3 is a diagram of example components of a device 300, which may correspond to client device 210 server device 230, and/or worker device 240. In some implementations, each of client device 210, server device 230, and/or worker device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for determining an order and dependencies associated with tasks that are to be performed by worker devices. In some implementations, the process blocks of FIG. 4 may be performed by client device 210. In some implementations, one or more process blocks of FIG. 4 may be performed by another device or a group of devices separate from or including client device 210, such as server device 230 and/or worker device 240.

As shown in FIG. 4, process 400 may include receiving information that identifies tasks that are to be performed by worker devices (block 410). For example, client device 210 may receive, from a user and/or from another device (e.g., server device 230), information that identifies tasks to be performed by worker devices 240. In some implementations, the user may interact with client device 210 (e.g., via TCE 220) to create, edit, and/or load the information that identifies the tasks. The information that identifies the tasks may include, for example, a block diagram model, a mathematical model, a flow chart, a directed acyclic graph, and/or a program code that describes the tasks.

A task may refer to an activity that is to be performed by TCE 220 operating on worker device 240. For example, the task may include evaluating a function, performing a computation, manipulating the state of a worker device, executing program code, or the like. In some implementations, a task may include an ordinary evaluation task. An ordinary evaluation task may include a task that, when executed, results in an output, associated with the task (e.g., a task associated with running a simulation of a model, a task associated with evaluating a function, etc.). Additionally, or alternatively, the task may include a state manipulation task. A state manipulation task may include a task that, when executed, results in the state of worker device 240 being manipulated, modified, updated, or the like (e.g., a task associated with loading data, a task associated with opening a socket, a task associated with closing a model, etc.). In some implementations, the tasks may include tasks of one or more types (e.g., some tasks, of the one or more tasks, may be ordinary evaluation tasks, while other tasks, of the one or more tasks, may be state manipulation tasks).

In some implementations, the user may provide input, via client device 210, indicating that multiple iterations of a task are to be performed by worker device 240. For example, a user of client device 210 may provide input (e.g., a program code, a DAG) that indicates that a particular number of iterations of a task (e.g., multiple iterations of an ordinary function evaluation, etc.) are to be performed, where each iteration is performed only once by a single worker device 240.

In some implementations, the user may provide input that indicates that a task that is to be performed on worker device 240 based on a performance of another task. For example, a user of client device 210 may provide input (e.g., a program code, a DAG) that indicates that a first task (e.g., a state manipulation task) is to be performed by worker device 240 before a second task (e.g., before any iteration of an ordinary evaluation task) is performed by worker device 240. As an additional example, the user may provide program code that indicates that a third task (e.g., another state manipulation task) is to be performed by worker device 240 after worker device 240 has performed the second task (e.g., after the final iteration of the evaluation task that is performed by worker device 240).

As further shown in FIG. 4, process 400 may include determining an order associated with performing the tasks (block 420). For example, client device 210 may determine an order I which the tasks are to be performed by worker devices 240. In some implementations, client device 210 may determine the order when client device 210 receives the information that identifies the tasks. Additionally, or alternatively, client device 210 may determine the order when client device 210 receives (e.g., from worker devices 240 or another device) an indication that worker devices 240 are available to perform the tasks.

An order associated with the tasks may include a sequence in which the tasks are to be performed. For example, the order may indicate that a first task is to be performed first, a second task is to be performed second, etc. In some implementations, client device 210 may determine the order associated with the tasks based on the information that identifies the tasks. For example, client device 210 may determine the order associated with the tasks based on program code that identifies the tasks (e.g., where the tasks are performed in the order described in the program code). As an additional example, client device 210 may determine the order based on a graphical data structure (e.g., a DAG) associated with the tasks. In some implementations, client device 210 may determine the order based on input provided by the user of client device 210 (e.g., where the user specifies the order via a user interface).

As further shown in FIG. 4, process 400 may include determining dependencies associated with the tasks (block 430). For example, client device 210 may determine dependencies associated with tasks that are to be performed by worker devices 240. In some implementations, client device 210 may determine the dependencies when client device 210 receives the information that identifies the tasks. Additionally, or alternatively, client device 210 may determine the dependencies when client device 210 receives (e.g., from worker devices 240 or another device) an indication that worker devices 240 are available to perform the tasks. Additionally, or alternatively, client device 210 may determine the dependencies based on the order associated with the tasks.

A dependency associated with the tasks may include a relationship, between two or more tasks, that indicates that the performance of a first task depends on the performance of a second task. For example, the dependency may indicate that performing a second task (e.g., a task associated with executing a model) depends on the performance of a first task (e.g., a task associated with loading the model). As an additional example, the dependency may indicate that performing a third task (e.g., a task associated with closing the model) depends on the performance of the second task (e.g., the task associated with executing the model).

In some implementations, client device 210 may determine the dependencies associated with the tasks based on the information that identifies the tasks. For example, client device 210 may determine the dependencies associated with the tasks based on program code that identifies the tasks. As an additional example, client device 210 may determine the dependencies based on other information (e.g., a DAG) associated with the tasks. In some implementations, client device 210 may determine the dependencies based on input provided by the user of client device 210 (e.g., where the user specifies the dependencies via a user interface).

As further shown in FIG. 4, process 400 may include storing the information that identifies the tasks, information that identifies the order, and information that identifies the dependencies (block 440). For example, client device 210 may store the information that identifies the tasks, information that identifies the order associated with the tasks, and information that identifies the dependencies associated with the tasks. In some implementations, client device 210 may store the information when client device 210 determines the order and/or the dependencies associated with the tasks. In some implementations, client device 210 may store the information when client device 210 receives the information from another device (e.g., server device 230).

In some implementations, client device 210 may store the information in a memory location associated with client device 210, a memory location associated with server device 230, and/or a memory location associated with one or more worker devices 240. In some implementations, client device 210 may store the information in a memory location accessible to worker devices 240, and worker devices 240 may access the information when worker devices 240 are available to perform the tasks.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
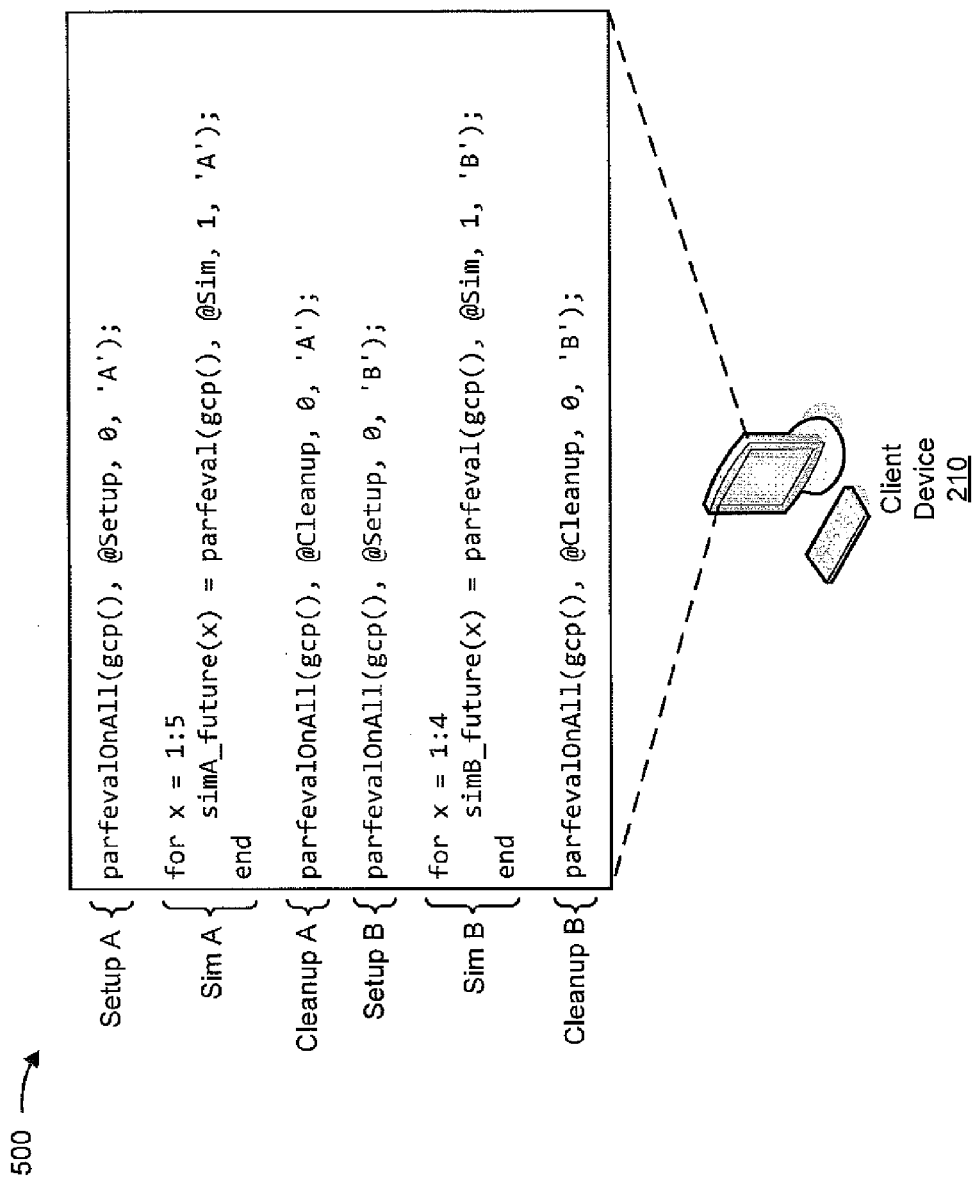
FIGS. 5A and 5B are diagrams of an example implementation relating to the example process shown in FIG. 4.
Figure 5B:
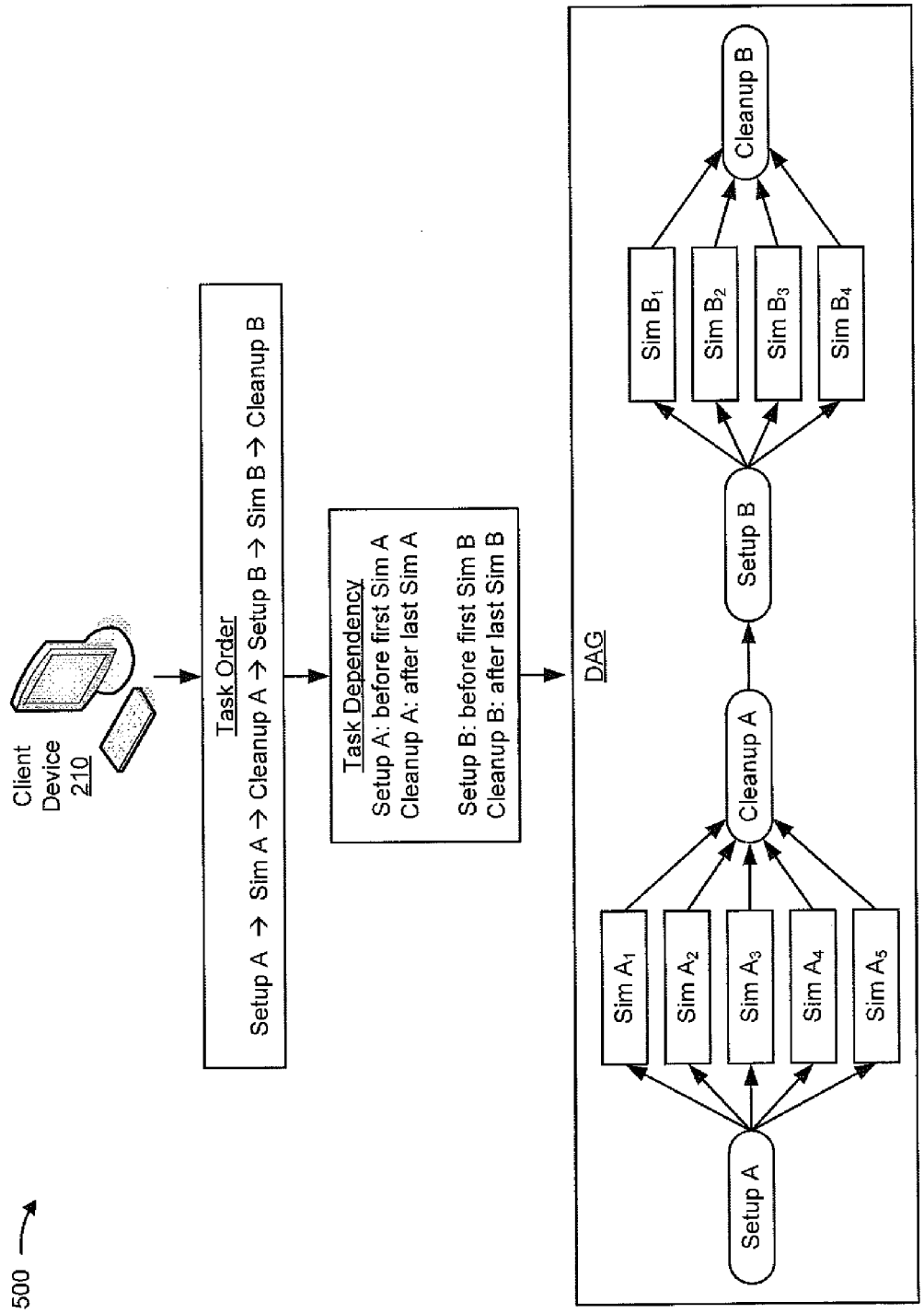

FIGS. 5A and 5B are diagrams of an example implementation 500 relating to example process 400 shown in FIG. 4. For the purposes of example implementation 500, assume that a user of client device 210 wishes for worker devices, included in a parallel pool, to perform a setup task, simulation task, and cleanup task, and that client device 210 stores information required to perform each task. Further, assume that the user wishes for each of the three tasks to be performed for two inputs, identified as A and B. Finally, assume that the user wants five iterations of the simulation task to be performed using A as an input, and that the user wants four iterations of the simulation task to be performed using B as the input.

As shown in FIG. 5A, client device 210 may receive, via input from the user, program code that identifies the three tasks, identified as "@Setup," "@Sim," and "@Cleanup." As shown by the first section of program code, the user may indicate that the first task that is to be performed is the @Setup task associated with input A (hereinafter referred to as "Setup A"):

parfevalOnAll(gcp( ), @Setup, 0, 'A');

As shown, the first section of program code may indicate (e.g., using the "parfevalonall" command) that Setup A is a state manipulation task (e.g., that Setup A is to be performed on all worker devices included in a parallel pool identified using the "gcp( )" command). The first section of program code may also indicate that zero outputs are required when performing Setup A, and may identify "A" as the input that is associated with performing Setup A.

As shown by the second section of program code in FIG. 5A, the user may indicate that the second task that is to be performed is the @Sim task using A as an input (hereinafter referred to as "Sim A"):

for x=1:5
    simA_future(x)=parfeval(gcp( ), @Sim, 1, 'A');
end

As shown, the second section of program code may include a FOR loop that indicates that five iterations (e.g., "x=1:5") of Sim A are to be performed. As also shown, the program code may indicate (e.g. using the "parfeval" command) that Sim A is an ordinary evaluation task (e.g., each iteration of Sim A is to be performed only once by one worker device in the parallel pool, that one output is required per iteration, and may identify "A" as the input associated with performing each iteration of Sim A. As shown, the result of each iteration of Sim A may be stored using a variable identified as "simA_future(x)" (e.g., where x is to identify one of the five iterations of Sim A).

As shown by the third section of program code, the user may indicate that the third task that is to be performed is the @Cleanup task associated with input A (hereinafter referred to as "Cleanup A"):

parfevalOnAll(gcp( ), @Cleanup, 0, 'A');

As shown, the third section of program code may indicate (e.g., using the "parfevalonall" command) that Cleanup A is a state manipulation task (e.g., that Cleanup A is to be performed on all worker devices included in a parallel pool). The third section of program code may also indicate that zero outputs are required when performing Cleanup A, and may identify "A" as the input that is associated with performing Cleanup A.

As shown by the fourth section of program code, the user may indicate that the fourth task that is to be performed is the @ Setup task associated with input B (hereinafter referred to as "Setup B"):

parfevalOnAll(gcp( ), @Setup, 0, 'B');

As shown, the fourth section of program code may indicate (e.g., using the "parfevalonall" command) that Setup B is a state manipulation task (e.g., that Setup B is to be performed on all worker devices included in a parallel pool). The fourth section of program code may also indicate that zero outputs are required when performing Setup B, and may identify "B" as the input that is associated with performing Setup B.

As shown by the fifth section of program code in FIG. 5A, the user may indicate that the fifth task that is to be performed is the @ Sim task using B as an input (hereinafter referred to as "Sim B"):

for x=1:4
    simB_future(x)=parfeval(gcp( ), @Sim, 1, 'B');
end

As shown, the fifth section of program code may include a FOR loop that indicates that four iterations (e.g., "x=1:4") of Sim B are to be performed. As also shown, the program code may indicate (e.g. using the "parfeval" command) that Sim B is an ordinary evaluation task (e.g., that each iteration of Sim B is to be performed only once by one worker device in the parallel pool), that one output is required per iteration, and may identify "B" as the input associated with performing each iteration of Sim B. As shown, the result of each iteration of Sim B may be stored using a variable identified as "simB_future(x)" (e.g., where x is to identify one of the four iterations of Sim B).

As shown by the sixth section of program code, the user may indicate that the sixth task that is to be performed is the @Cleanup task associated with input B (hereinafter referred to as "Cleanup B"):

parfevalOnAll(gcp( ), @Cleanup, 0, 'B');

As shown, the sixth section of program code may indicate (e.g., using the "parfevalonall" command) that Cleanup B is a state manipulation task (e.g., that Cleanup B is to be performed on all worker devices included in a parallel pool. The sixth section of program code may also indicate that zero outputs are required when performing Cleanup B, and may identify "B" as the input that is associated with performing Cleanup B.

As shown in FIG. 5B, client device 210 may determine an order and may determine a dependency associated with the Setup A, Sim A, Cleanup A, Setup B, Sim B, and Cleanup B tasks identified in the program code. As shown, client device 210 may generate, based on the program code, a DAG that indicates the order and the dependency.

As shown, client device 210 may determine the order associated with the tasks as Setup A→Sim A→Cleanup A→Setup B→Sim B→Cleanup B. Client device 210 may determine the order of the tasks based on the order in which the tasks appear in the program code (e.g., the order in which the user enters the tasks).

As further shown in FIG. 5B, client device 210 may determine a dependency associated with the tasks included in the program code. As shown, client device 210 may determine, based on Setup A being a state manipulation task (e.g., as identified by the use of the "parfevalonall" command), that Setup A is to be performed by a worker device before the worker device may perform any iteration of Sim A. As shown, client device 210 may also determine based on Cleanup A being a state manipulation task (e.g., as identified by the use of the "parfevalonall" command), that Cleanup A is to be performed by the worker device after the worker device performs a final iteration of Sim A that is assigned to the worker device.

As also shown, client device 210 may determine, based on Setup B being a state manipulation task (e.g., as identified by the use of the "parfevalonall" command), that Setup B is to be performed by a worker device before the worker device may perform any iteration of Sim B. As shown, client device 210 may also determine based on Cleanup B being a state manipulation task (e.g., as identified by the use of the "parfevalonall" command), that Cleanup B is to be performed by the worker device after the worker device performs a final iteration of Sim B that is assigned to the worker device. As shown, client device 210 may store the program code, the DAG, information identifying the order, and information identifying each dependency associated with the tasks identified in the program code.

As indicated above, FIGS. 5A and 5B are provided merely as an example. Other examples are possible and may differ from what was described with regard to FIGS. 5A and 5B.

FIG. 6 is a flow chart of an example process 600 for performing tasks. In some implementations, the process blocks of FIG. 6 may be performed by client device 210. In some implementations, one or more process blocks of FIG. 6 may be performed by another device or a group of devices separate from or including client device 210, such as server device 230 and/or worker devices 240.

As shown in FIG. 6, process 600 may include determining a task, of a group of tasks, that is to be performed by a worker device, of a group of worker devices (block 610). For example, client device 210 may determine a task, of a group of tasks, that is to be performed by worker device 240. In some implementations, client device 210 may determine the task when client device 210 receives (e.g., from worker device 240) an indication that worker device 240 is available to perform a task associated with client device 210 (e.g., when worker device 240 finishes another task, when there are no other tasks in a task queue associated with worker device 240, etc.).

In some implementations, client device 210 may determine the task based on information stored by client device 210. For example, client device 210 may store information that identifies the group of tasks, information that identifies an order associated with the group of tasks, and information that identifies a dependency associated with the tasks in the group of tasks, and client device 210 may determine a task based on the stored information. Additionally, or alternatively, client device 210 may determine the task based on information stored by another device (e.g., server device 230).

In some implementations, client device 210 may determine the task (e.g., to be performed by worker device 240) based on the order associated with the group of tasks. For example, if no tasks, of the group of tasks, have been performed by worker device 240, client device 210 may determine a first task (e.g., a first task identified by the order associated with the group of tasks) that is to be performed by worker device 240. As another example, client device 210 may determine a second task (e.g., a task that immediately follows the first task identified by the order) that is to be performed based on information indicating that the first task has been performed.

Additionally, or alternatively, client device 210 may determine the task to be performed by worker device 240 based on a dependency associated with the group of tasks. For example, client device 210 may determine that an iteration of a first task has been performed by worker device 240, and may determine that there are no additional iterations of the first task to be performed by worker device 240. Client device 210 may determine a second task to be performed by worker device 240 based on a dependency associated with the first task and the second task (e.g., a dependency that indicates that the second task is to be performed when all iterations of the first task are performed). As an alternative, client device 210 may determine that worker device 240 is to perform an additional iteration of the first task, and may provide, to worker device 240, information indicating that worker device 240 is to perform the additional iteration of the first task.

As an additional example, client device 210 may determine that a number of iterations of an evaluation task (e.g., a task associated with evaluating a function) are to be performed, and may determine, based on a dependency associated with the evaluation task and a state manipulation task (e.g., a task that loads information required to evaluate the function), that no iteration of the evaluation task is to be performed by worker device 240 until worker device 240 has performed the state manipulation task (e.g., worker device 240 may not evaluate the function until worker device 240 loads the information required to evaluate the function).

As further shown in FIG. 6, process 600 may include sending, to the worker device, information associated with performing the task (block 620). For example, client device 210 may send, to worker device 240, information associated with performing the task determined by client device 210. In some implementations, client device 210 may send the information associated with performing the task when client device 210 determines the task. Additionally, or alternatively, client device 210 may send the information, associated with performing the task, when client device 210 receives (e.g., from worker device 240) an indication that worker device 240 is available to perform the task. In some implementations, the information, associated with performing the task, may be stored at a location remote from client device 210. In some implementations, client device 210 may send, to worker device 240, information identifying the location from which the information, associated with performing the task, may be retrieved.

In some implementations, the information associated with performing the task may include information identifying the task (e.g., program code that, when executed, may cause worker device 240 to perform the task) and/or information stored by client device 210 associated with performing the task (e.g., information associated with a function, a simulation, a variable, etc., included in the program code). Additionally, or alternatively, the information associated with performing the task may include an indication that worker device 240 is to obtain information associated with performing the task from another device (e.g., server device 230), where worker device 240 is to perform the task based on the information obtained from the other device.

As further shown in FIG. 6, process 600 may include receiving, from the worker device, an indication that the task has been performed (block 630). For example, client device 210 may receive, from worker device 240, an indication that worker device 240 has performed the task (e.g., the task associated with the information sent by client device 210). In some implementations, client device 210 may receive the indication when worker device 240 has completed performing the task. In some implementations, client device 210 may receive the indication from worker device 240 and/or another device (e.g., server device 230) associated with client device 210.

In some implementations, the indication may indicate that worker device 240 is available to perform an additional task (e.g., that client device 210 is to determine and send another task to worker device 240). Additionally, or alternatively, the indication may include a result associated with performing the task. For example, worker device 240 may determine a result associated with performing the task (e.g., an output result associated with performing a simulation, an output result associated with evaluating a function, etc.), and worker device 240 may provide the result to client device 210.

As further shown in FIG. 6, process 600 may include providing a result associated with performing the task (block 640). For example, client device 210 may provide a result, received from worker device 240, associated with the task performed worker device 240. In some implementations, client device 210 may provide a result by storing information (e.g., a value associated with a variable, an output associated with a function, etc.) in a memory location associated with client device 210. In some implementations, client device 210 may store the result such that the user may access the result (e.g., by querying a variable, by querying an output, by querying a future, by viewing list of results, etc.) at a later time.

In some implementations, client device 210 may provide a result by updating a display (e.g., a graph associated with the result) associated with the task. In some implementations, client device 210 may update the display, to include the result, when the result is received from worker device 240. In some implementations, client device 210 may provide a result each time a result is received from worker device 240 (e.g., client device 210 may update a plot of results as each result is received). In some implementations, client device 210 may provide the result to another device, such as another worker device 240, server device 230, and/or another device.

As further shown in FIG. 6, process 600 may include determining whether there is another task that to be performed by the worker device (block 650). For example, client device 210 may determine whether there is another task that is to be performed by worker device 240. In some implementations, client device 210 may determine whether there is another task when client device 210 has provided the result associated with a first task (e.g., a task performed by worker device 240). Additionally, or alternatively, client device 210 may determine whether there is another task when client device 210 receives an indication that worker device 240 is available (e.g., when client device 210 receives an indication that worker device 240 has performed the first task).

In some implementations, client device 210 may determine whether there is another task to be performed by worker device 240 based on information that identifies the group of tasks. For example, client device 210 may determine that another task (e.g., another iteration of a task that has not been assigned to a worker device 240) is to be performed based on the information that identifies the group of tasks (e.g., a program code, a DAG, etc.). In some implementations, client device 210 may determine whether there is another task to be performed by worker device 240 based on information associated with a task being performed by another worker device 240. For example, client device 210 may track each task that is being performed by each worker device 240, and may determine that another task is to be performed by a particular worker device 240 based on tracking the performance of each task (e.g., where a first iteration of a task is being performed by a first worker device 240, a second worker device 240 need not perform the first iteration of the task).

In some implementations, client device 210 may determine whether there is another task to be performed by worker device 240 based on information that identifies an order associated with the group of tasks. For example, client device 210 may determine whether the most recent task performed by worker device 240 is the final task identified in the order associated with the group of tasks, and, if not, client device 210 may determine the next task identified in the order.

In some implementations, client device 210 may determine whether there is another task to be performed by worker device 240 based on information that identifies a dependency associated with the group of tasks. For example, client device 210 may determine that a second task (e.g., a state manipulation task) is to be performed by worker device 240 when worker device 240 has performed a first task (e.g., an ordinary evaluation task) upon which the second task is dependent (e.g., where worker device 240 will not perform any additional iterations of the ordinary evaluation task).

As further shown in FIG. 6, if there is not another task that is to be performed by the worker device (block 650—NO), then process 600 may include ending communication with the worker device. For example, if client device 210 determines that there is no task to be performed by worker device 240, then client device 210 may end communications associated with worker device 240. In some implementations, client device 210 may notify worker device 240 that there are no additional tasks.

As further shown in FIG. 6, if there is another task that is to be performed by the worker device (block 650-γES), then process 600 may include returning to block 610. For example, if client device 210 determines that there is another task that is to be performed by worker device 240, then client device 210 may determine the task (e.g., based on information, associated with performing the other task, stored by client device 210) as discussed above.

In this manner, client device 210 may guarantee that two or more tasks are performed in accordance with an order and/or a dependency, associated with the two or more tasks. Additionally, the two or more tasks may be performed by two or more worker devices 240 without the need for any synchronization between the two or more worker devices. (e.g., each worker device 240 may perform tasks independently of every other worker device).

Although FIG. 6 shows example blocks of process 600, in some implementations, process 600 may include additional blocks, different blocks, fewer blocks, or differently arranged blocks than those depicted in FIG. 6. Additionally, or alternatively, two or more of the blocks of process 600 may be performed in parallel.

Figure 7A:
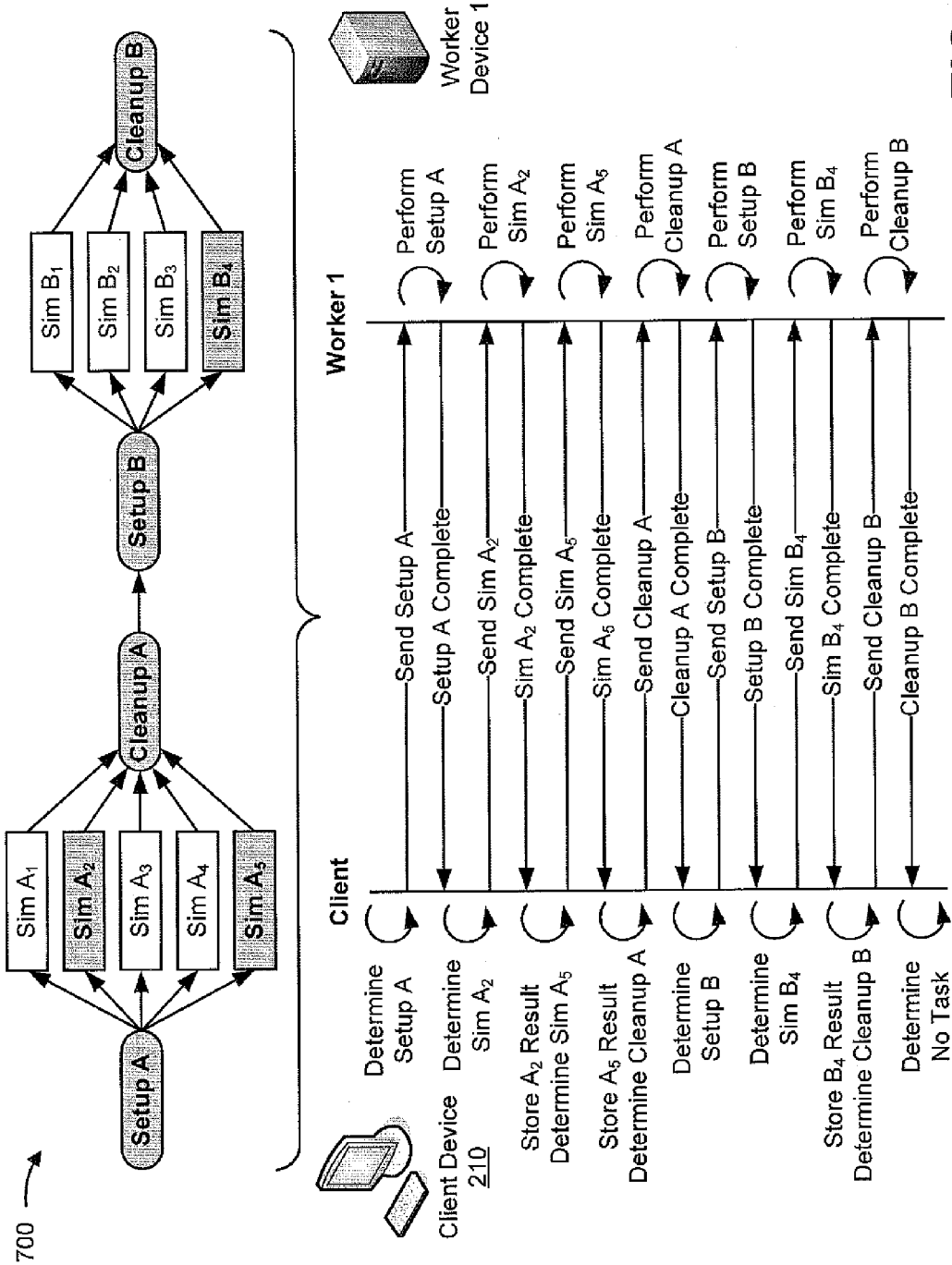
FIGS. 7A-7D are diagrams of an example implementation relating to the example process shown in FIG. 6.
Figure 7B:
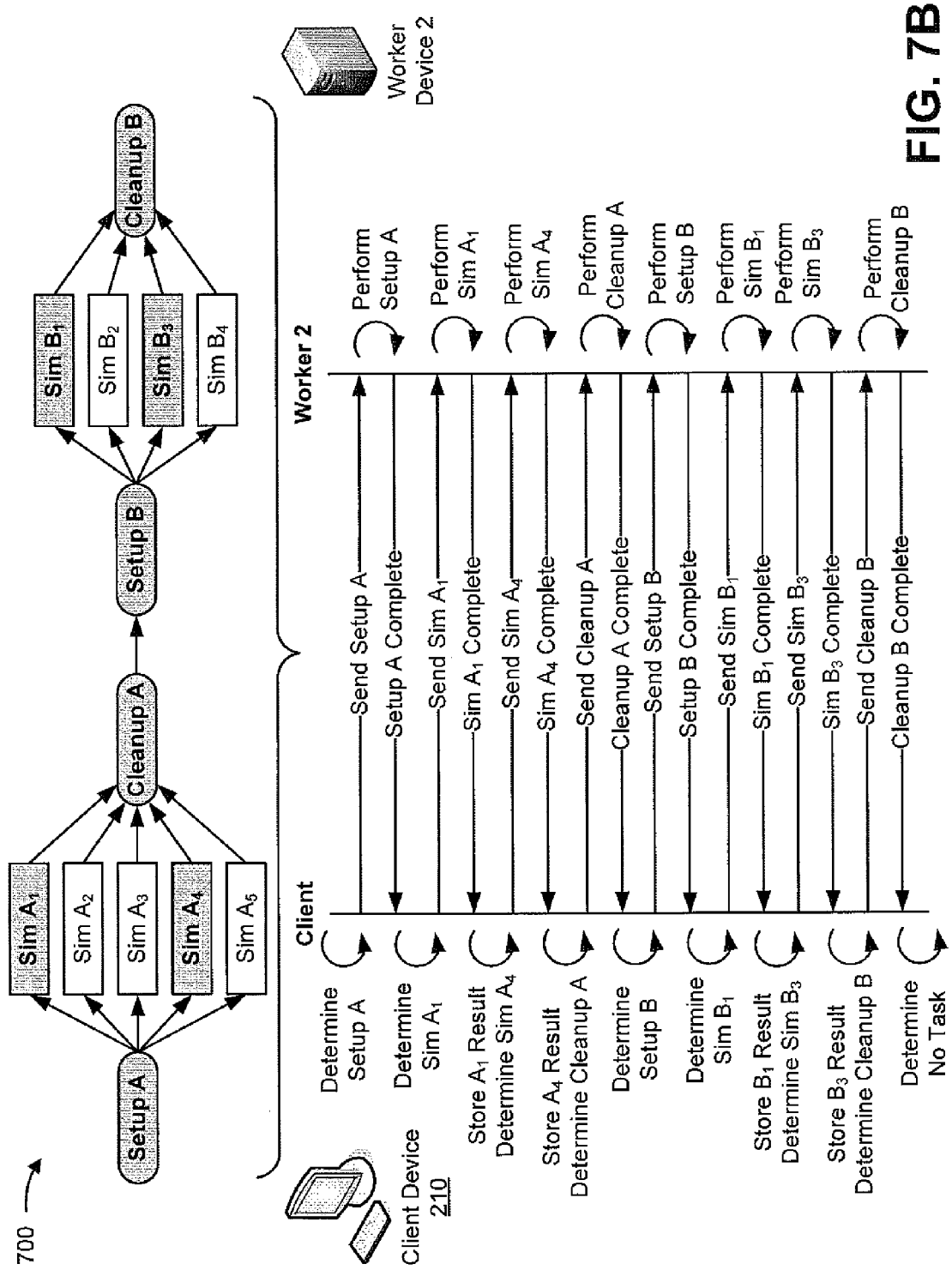
Figure 7C:
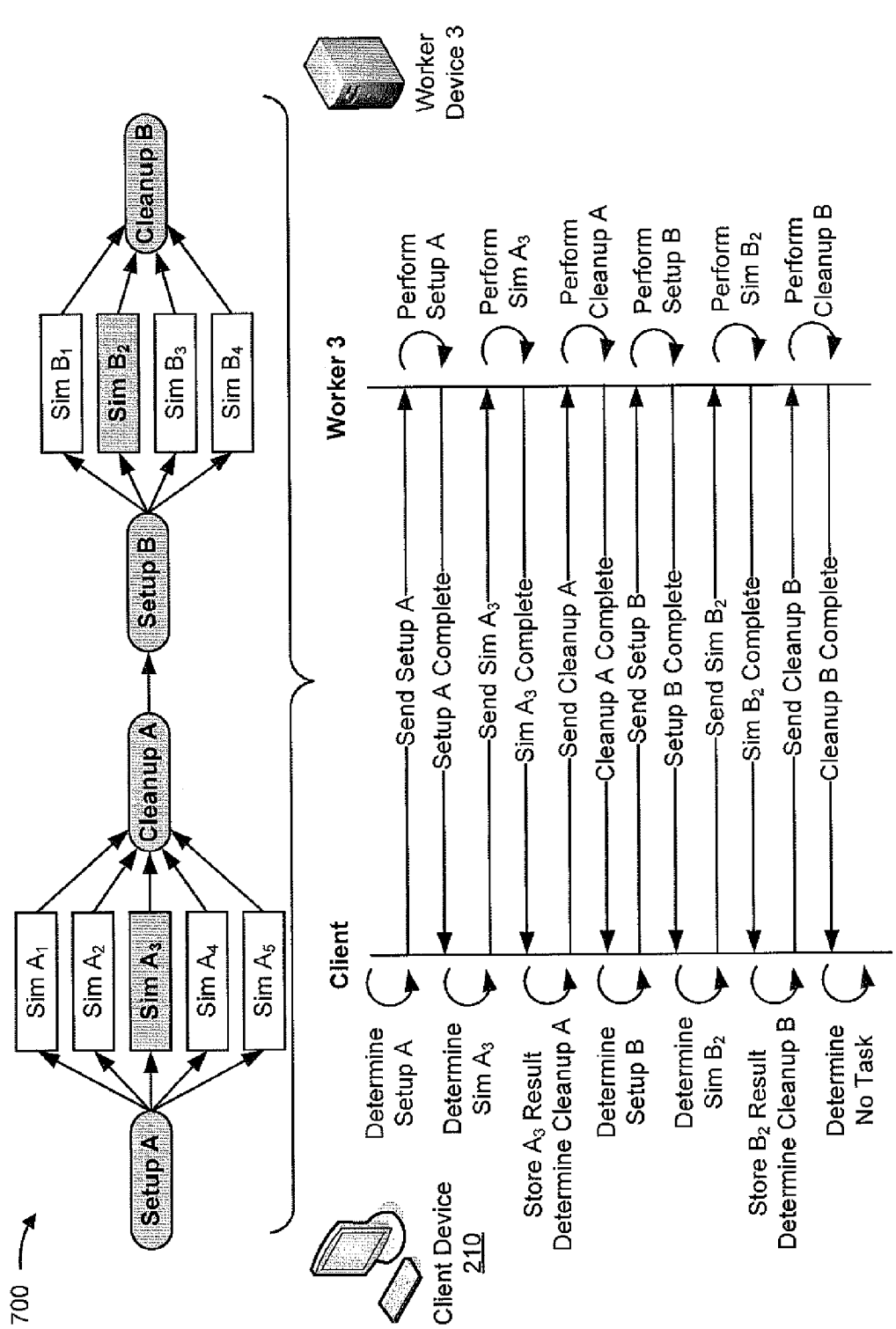

FIGS. 7A-7D are diagrams of an example implementation 700 relating to example process 600 shown in FIG. 6. For the purposes of example implementation 700, assume that client device 210 stores information required to perform a group of tasks, identified as Setup A, $SimA_1$-$SimA_5$ (e.g., five iterations of Sim A), Cleanup A, Setup B, $Sim B_1$-$Sim B_4$ (e.g., four iterations of Sim B), and Cleanup B. Further assume, that client device 210 has determined an order associated with the group of tasks, a number of dependencies associated with two or more of the group of tasks, and a DAG that represents the group of tasks, the order, and the dependencies. Finally, assume that three worker devices, identified as worker device 1, worker device 2, and worker device 3, are available to perform the group of tasks, and that each of the three worker devices will be performing tasks simultaneously. The processing of tasks, by worker device 1, is shown in FIG. 7A. The processing of tasks, by worker device 2, is shown in FIG. 7B. The processing of tasks, by worker device 3, is shown in FIG. 7C.

As shown in FIG. 7A, client device 210 may determine that worker device 1 is to perform Setup A. Client device 210 may determine that worker device 1 is to perform Setup A based on determining that Setup A is the first task in the order associated with the group of tasks, and based on a dependency indicating that Setup A (e.g., a state manipulation task) is to be performed by worker device 1 before any iterations of Sim A (e.g., an evaluation task) are performed by worker device 1. As shown, client device 210 may send information associated with performing Setup A to worker device 1. Worker device 1 may perform Setup A, and may send an indication, to client device 210, that Setup A has been performed, as shown.

Assume that worker device 1, worker device 2, and worker device 3 complete performing Setup A in the following order: worker device 2, worker device 1, and worker device 3. Thus, client device 210 determines that Sim $A_1$ is to be performed by worker device 2 (e.g., since worker device 2 completed performing Setup A before worker device 1). As such, client device 210 may determine that Sim $A_2$ is the next task that worker device 1 is to perform (e.g., since worker device 1 completed performing Setup A before worker device 3). Client device 210 may send information associated with performing Sim $A_2$ to worker device 1. As shown, worker device 1 may perform Sim $A_2$, and may send a result, associated with performing Sim $A_2$, to client device 210. Client device 210 may store the result, as shown.

Further, assume that, while worker device 1 is performing Sim $A_2$, worker device 3 begins performing Sim $A_3$ (e.g., after worker device 3 finishes performing Setup A), and that worker device 2 begins performing Sim $A_4$ (e.g., after worker device 1 finishes performing Sim $A_1$). Thus, as further shown in FIG. 7A, client device 210 may determine that Sim $A_5$ is the next task that worker device 1 is to perform (e.g., since worker device 3 and worker device 2 are performing Sim $A_3$ and Sim $A_4$, respectively). Client device 210 may send information associated with performing Sim $A_5$ to worker device 1. As shown, worker device 1 may perform Sim $A_5$, and may send a result, associated with performing Sim $A_5$, to client device 210. Client device 210 may store the result, as shown.

As shown, client device 210 may determine that there are no additional iterations of Sim A that are to be performed (e.g., each of the iterations has been performed by one of the three worker devices). As such, client device 210 may determine that worker device 1 is to perform Cleanup A (e.g., based on a dependency, associated with Sim A and Cleanup A, indicating that a worker device is to perform Cleanup A after the worker device has performed the last iteration of Sim A that will be performed by the worker device). As shown, client device 210 may send information associated with performing Cleanup A to worker device 1. As shown, worker device 1 may perform Cleanup A, and may send, to client device 210, an indication that Cleanup A has been performed.

As further shown in FIG. 7A, client device 210 may determine that worker device 1 is to perform Setup B. Client device 210 may determine that worker device 1 is to perform Setup B based on determining that Setup B is the next task (e.g., after Cleanup A) identified in the order associated with the group of tasks. Alternatively, client device may determine that Setup B (e.g., a state manipulation task) is to be performed by worker device 1 before any iterations of Sim B (e.g., an evaluation task) are performed by worker device 1. As shown, client device 210 may send information associated with performing Setup B to worker device 1. As shown, worker device 1 may perform Setup B, and may send, to client device 210, an indication that Setup B has been performed.

Assume that client device 210 determines that worker device 2 has performed Sim $B_1$, worker device 3 is performing Sim $B_2$, and that worker device 2 is performing Sim $B_3$. As such, client device 210 may determine that Sim $B_4$ is the next task that worker device 1 is to perform. Client device 210 may send information associated with performing Sim $B_4$ to worker device 1. As shown, worker device 1 may perform Sim $B_4$, and may send a result, associated with performing Sim $B_4$, to client device 210. Client device 210 may store the result, as shown.

As further shown, client device 210 may determine that there are no additional iterations of Sim B that are to be performed (e.g., each of the iterations has been performed by one of the three worker devices). As such, client device 210 may determine that worker device 1 is to perform Cleanup B (e.g., based on a dependency, associated with Sim B and Cleanup B, indicating that a worker device is to perform Cleanup B after the worker device has performed the last iteration of Sim B that will be performed by the worker device). As shown, client device 210 may send information associated with performing Cleanup B to worker device 1. As shown, worker device 1 may perform Cleanup B, and may send, to client device 210, an indication that Cleanup B has been performed. As shown, worker device 210 may determine that there are no additional tasks to be performed by worker device 1, and client device 210 may end communications with worker device 1.

As shown in FIG. 7B, client device 210 may determine that worker device 2 is to perform Setup A. Client device 210 may determine that worker device 2 is to perform Setup A based on determining that Setup A is the first task in the order associated with the group of tasks, and based on a dependency indicating that Setup A (e.g., a state manipulation task) is to be performed by worker device 2 before any iterations of Sim A (e.g., an evaluation task) are performed by worker device 2. As shown, client device 210 may send information associated with performing Setup A to worker device 2. Worker device 2 may perform Setup A, and may send an indication, to client device 210, that Setup A has been performed, as shown.

As further shown, client device 210 may determine that Sim $A_1$ is the next task that worker device 2 is to perform (e.g., since, as indicated above, worker device 2 is the first worker device to finish performing Setup A). Client device 210 may send information associated with performing Sim $A_1$ to worker device 2. As shown, worker device 2 may perform Sim $A_1$, and may send a result, associated with performing Sim $A_1$, to client device 210. Client device 210 may store the result, as shown.

As further shown in FIG. 7B, client device 210 may determine that Sim $A_4$ is the next task that worker device 2 is to perform (e.g., since, as indicated above, worker device 1 and worker device 3 are performing Sim $A_2$ and Sim $A_3$, respectively). Client device 210 may send information associated with performing Sim $A_4$ to worker device 2. As shown, worker device 2 may perform Sim $A_4$, and may send a result, associated with performing Sim $A_4$, to client device 210. Client device 210 may store the result, as shown.

As shown, client device 210 may determine that there are no additional iterations of Sim A that are to be performed (e.g., each of the iterations has been performed by one of the three worker devices). As such, client device 210 may determine that worker device 2 is to perform Cleanup A (e.g., based on a dependency, associated with Sim A and Cleanup A, indicating that a worker device is to perform Cleanup A after the worker device has performed the last iteration of Sim A that will be performed by the worker device). As shown, client device 210 may send information associated with performing Cleanup A to worker device 2. As shown, worker device 2 may perform Cleanup A, and may send, to client device 210, an indication that Cleanup A has been performed.

As further shown in FIG. 7B, client device 210 may determine that worker device 2 is to perform Setup B. Client device 210 may determine that worker device 2 is to perform Setup B based on determining that Setup B is the next task (e.g., after Cleanup A) identified in the order associated with the group of tasks, and based on a dependency indicating that Setup B (e.g., a state manipulation task) is to be performed by worker device 2 before any iterations of Sim B (e.g., an evaluation task) are performed by worker device 2. As shown, client device 210 may send information associated with performing Setup B to worker device 2. As shown, worker device 2 may perform Setup B, and may send, to client device 210, an indication that Setup B has been performed.

As further shown, client device 210 may determine that Sim $B_1$ is the next task that worker device 2 is to perform (e.g., since, as indicated above, worker device 2 is the first worker device to finish performing Setup B). Client device 210 may send information associated with performing Sim $B_1$ to worker device 2. As shown, worker device 2 may perform Sim $B_1$, and may send a result, associated with performing Sim $B_1$, to client device 210. Client device 210 may store the result, as shown.

As further shown in FIG. 7B, client device 210 may determine that Sim $B_3$ is the next task that worker device 2 is to perform (e.g., where worker device 3 is performing Sim $B_2$). Client device 210 may send information associated with performing Sim $B_3$ to worker device 2. As shown, worker device 2 may perform Sim $B_3$, and may send a result, associated with performing Sim $B_3$, to client device 210. Client device 210 may store the result, as shown.

As further shown, client device 210 may determine that there are no additional iterations of Sim B that are to be performed (e.g., each of the iterations has been performed by one of the three worker devices). As such, client device 210 may determine that worker device 2 is to perform Cleanup B (e.g., based on a dependency, associated with Sim B and Cleanup B, indicating that a worker device is to perform Cleanup B after the worker device has performed the last iteration of Sim B that will be performed by the worker device). As shown, client device 210 may send information associated with performing Cleanup B to worker device 2. As shown, worker device 2 may perform Cleanup B, and may send, to client device 210, an indication that Cleanup B has been performed. As shown, worker device 210 may determine that there are no additional tasks to be performed by worker device 2, and client device 210 may end communications with worker device 2.

As shown in FIG. 7C, client device 210 may determine that worker device 3 is to perform Setup A. Client device 210 may determine that worker device 3 is to perform Setup A based on determining that Setup A is the first task in the order associated with the group of tasks, and based on a dependency indicating that Setup A (e.g., a state manipulation task) is to be performed by worker device 3 before any iterations of Sim A (e.g., an evaluation task) are performed by worker device 3. As shown, client device 210 may send information associated with performing Setup A to worker device 3. Worker device 3 may perform Setup A, and may send an indication, to client device 210, that Setup A has been performed, as shown.

As further shown, client device 210 may determine that Sim $A_3$ is the next task that worker device 3 is to perform (e.g., since, as set forth above, worker device 1 and worker device 2 are performing Sim $A_2$ and Sim $A_1$, respectively). As shown, client device 210 may send information associated with performing Sim $A_3$ to worker device 3. As shown, worker device 3 may perform Sim $A_3$, and may send a result, associated with performing Sim $A_3$, to client device 210. Client device 210 may store the result, as shown.

As shown, client device 210 may determine that there are no additional iterations of Sim A that are to be performed (e.g., each of the iterations has been performed by one of the three worker devices). As such, client device 210 may determine that worker device 3 is to perform Cleanup A (e.g., based on a dependency, associated with Sim A and Cleanup A, indicating that a worker device is to perform Cleanup A after the worker device has performed the last iteration of Sim A that will be performed by the worker device). As shown, client device 210 may send information associated with performing Cleanup A to worker device 3. As shown, worker device 3 may perform Cleanup A, and may send, to client device 210, an indication that Cleanup A has been performed.

As further shown in FIG. 7C, client device 210 may determine that worker device 3 is to perform Setup B. Client device 210 may determine that worker device 3 is to perform Setup B based on determining that Setup B is the next task (e.g., after Cleanup A) identified in the order associated with the group of tasks, and based on a dependency indicating that Setup B (e.g., a state manipulation task) is to be performed by worker device 3 before any iterations of Sim B (e.g., an evaluation task) are performed by worker device 3. As shown, client device 210 may send information associated with performing Setup B to worker device 3. As shown, worker device 3 may perform Setup B, and may send, to client device 210, an indication that Setup B has been performed.

As further shown, client device 210 may determine that Sim $B_2$ is the next task that worker device 3 is to perform (e.g., since worker device 2 is performing Sim $B_1$). Client device 210 may send information associated with performing Sim $B_2$ to worker device 3. As shown, worker device 3 may perform Sim $B_2$, and may send a result, associated with performing Sim $B_2$, to client device 210. Client device 210 may store the result, as shown.

As further shown, client device 210 may determine that there are no additional iterations of Sim B that are to be performed (e.g., each of the iterations has been performed by one of the three worker devices). As such, client device 210 may determine that worker device 3 is to perform Cleanup B (e.g., based on a dependency, associated with Sim B and Cleanup B, indicating that a worker device is to perform Cleanup B after the worker device has performed the last iteration of Sim B that will be performed by the worker device). As shown, client device 210 may send information associated with performing Cleanup B to worker device 3. As shown, worker device 3 may perform Cleanup B, and may send, to client device 210, an indication that Cleanup B has been performed. As shown, worker device 210 may determine that there are no additional tasks to be performed by worker device 3, and client device 210 may end communications with worker device 3.

Figure 7D:
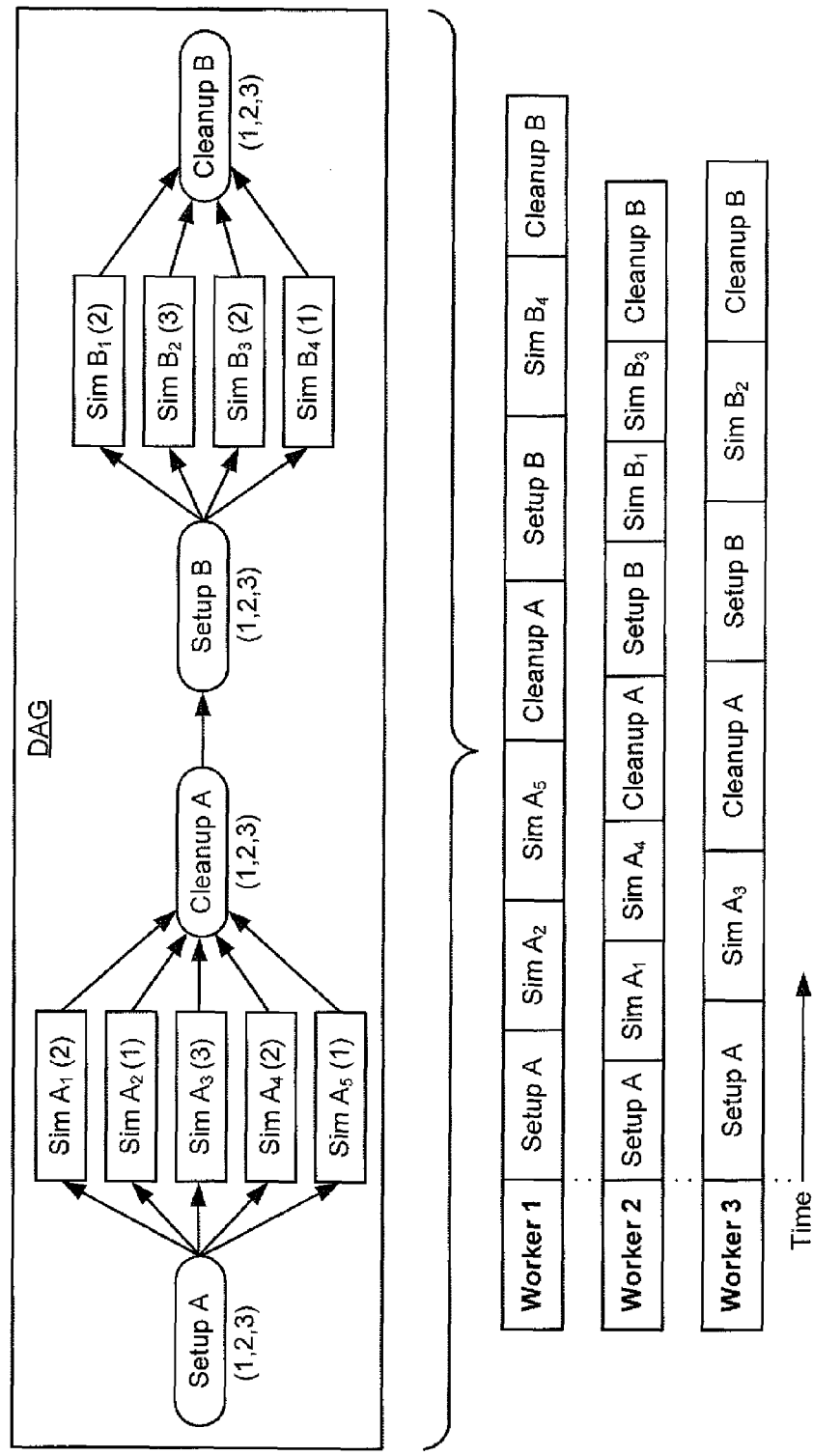

FIG. 7D represents a summary associated with the group of the tasks performed by the three worker device described in FIGS. 7A-7C. As shown by the directed acyclic graph included in FIG. 7D, the summary may indicate that worker device 1 performed Setup A, Sim $A_2$, Sim $A_5$, Cleanup A, Setup B, Sim $B_4$, and Cleanup B. Similarly, the summary may indicate that worker device 2 performed Setup A, Sim $A_1$, Sim $A_4$, Cleanup A, Setup B, Sim $B_1$, Sim $B_3$, and Cleanup B. Finally, the summary may indicate that worker device 3 performed Setup A, Sim $A_3$, Cleanup A, Setup B, Sim $B_2$, and Cleanup B.

As further shown in FIG. 7D, the summary may be additionally or alternatively represented in the form of a bar graph, where each block included in the bar graph may indicate a length of time associated with performing each task performed by each worker device (e.g., using a block of a particular horizontal length). For example, as shown in the bar graph, worker device 1, worker device 2, and worker device 3 each started performing Setup A at the same time. However, as shown by the bar graph, each worker device completed performing Setup A at a different time (e.g., worker device 2 finished performing Setup A before worker device 1 and worker device 3, worker device 1 finished performing Setup A before work device 3). As shown, worker device 1, worker device 2, and worker device 3 finished performing each task at a different time. Client device 210 may store and/or display the bar graph and/or the DAG for later viewing by the user.

As illustrated by the bar graph included in FIG. 7D, no synchronization between the worker devices was required (e.g., a worker device was not required to wait for another worker device to finish performing a task before another task was assigned to the worker device, the worker devices were not required to be performing the same task at any time, etc.).

As further shown, the worker devices may finish their respective tasks at different times (e.g., worker device 2 finished first, worker device 3 finished second, worker device 1 finished third). However, the bar graph included in FIG. 7D illustrates that all tasks were completed in the proper order and with the proper dependencies (e.g., Setup A→Sim A→Cleanup A→Setup B→Sim B→Cleanup B, Setup A was performed by a worker device before any Sim A was performed by the worker device, Cleanup B was performed by a worker device after a last iteration of Sim B was performed by the worker device, etc.)

As indicated above, FIGS. 7A-7D are provided merely as an example. Other examples are possible and may differ from what was described with regard to FIGS. 7A-7D.

Implementations described herein may allow a client device to execute an asynchronous construct that allows the client device to execute program code while worker devices are performing a group of tasks. Using this construct, the client device may also guarantee that the group of tasks are performed in a specified order and in accordance with specified dependencies associated with the group of tasks.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A non-transitory computer-readable medium storing instructions, the instructions comprising:
one or more instructions that, when executed by one or more processors, cause the one or more processors to:
identify a group of tasks to be performed by a pool of worker devices,
the group of tasks including a state manipulation task to be performed by every worker device, included in the pool of worker devices, to modify a state of every worker device, and
the group of tasks including a plurality of ordinary evaluation tasks,
each ordinary evaluation task, included in the plurality of ordinary evaluation tasks, to be performed by a single worker device included in the pool of worker devices;
identify an order associated with performing the group of tasks,
the order indicating that the plurality of ordinary evaluation tasks are to be performed before the state manipulation task;
determine that a final ordinary evaluation task, included in the plurality of ordinary evaluation tasks, is to be performed by a worker device included in the pool of worker devices,
the determination being based on the order and information associated with performing at least one other ordinary evaluation task included in the plurality of ordinary evaluation tasks;
send, to the worker device, information associated with performing the final ordinary evaluation task; and
send, to another worker device included in the pool of worker devices, information associated with performing the state manipulation task based on sending the information associated with performing the final ordinary evaluation task and before receiving an indication that the final ordinary evaluation task has been performed by the worker device.

2. The non-transitory computer-readable medium of claim 1, where the one or more instructions, when executed by the one or more processors, further cause the one or more processors to:
receive, via user input, program code associated with the group of tasks that are to be performed by the pool of worker devices; and
where the one or more instructions, that cause the one or more processors to identify the group of tasks, cause the one or more processors to:
identify the group of tasks based on receiving the program code associated with the group of tasks.

3. The non-transitory computer-readable medium of claim 1, where the one or more instructions, when executed by the one or more processors, further cause the one or more processors to:
determine information associated with program code that, when executed, causes the final ordinary evaluation task to be performed; and
where the one or more instructions, that cause the one or more processors to send the information associated with performing the final ordinary evaluation task, cause the one or more processors too:
send the information associated with the program code.

4. The non-transitory computer-readable medium of claim 1, where the one or more instructions, when executed by the one or more processors, further cause the one or more processors to:
receive a result associated with performing the final ordinary evaluation task; and
update a display screen, associated with the group of tasks, based on the result associated with performing the final ordinary evaluation task.

5. The non-transitory computer-readable medium of claim 1, where the one or more instructions, that cause the one or more processors to determine that the final ordinary evaluation task is to be performed, cause the one or more processors to:
determine that the final ordinary evaluation task has not been performed by any worker device, included in the pool of worker devices, and that all preceding ordinary evaluation tasks, included in the plurality of ordinary evaluation tasks, have been performed; and
determine that the final ordinary evaluation task is to be performed based on determining that the final ordinary evaluation task has not been performed by any worker device and that all preceding ordinary evaluation tasks have been performed.

6. The non-transitory computer-readable medium of claim 1, where the one or more instructions, when executed by the one or more processors, cause the one or more processors to:
execute program code while waiting for a result of performing the final ordinary evaluation task.

7. The non-transitory computer-readable medium of claim 1, where the group of tasks is associated with iterations of a parallel loop included in program code.

8. A method, comprising:
identifying, by a device, a group of tasks to be performed by a pool of worker devices,
the group of tasks including a state manipulation task to be performed by every worker device, included in the pool of worker devices, to modify a state of every worker device, and
the group of tasks including a plurality of ordinary evaluation tasks,
each ordinary evaluation task, included in the plurality of ordinary evaluation tasks, to be performed by a single worker device included in the pool of worker devices;
identifying, by the device, an order associated with performing the group of tasks,
the order indicating that the plurality of ordinary evaluation tasks are to be performed before the state manipulation task;

determining, by the device, that a final ordinary evaluation task, included in the plurality of ordinary evaluation tasks, is to be performed by a worker device included in the pool of worker devices,
   the determination being based on the order and information associated with performing at least one other ordinary evaluation task included in the plurality of ordinary evaluation tasks;
sending, by the device and to the worker device, information associated with performing the final ordinary evaluation task; and
sending, by the device and to another worker device included in the pool of worker devices, information associated with performing the state manipulation task based on sending the information associated with performing the final ordinary evaluation task and before receiving an indication that the final ordinary evaluation task has been performed by the worker device.

9. The method of claim 8, further comprising:
receiving, via user input, program code associated with the group of tasks that are to be performed by the pool of worker devices; and
where identifying the group of tasks comprises:
   identifying the group of tasks based on receiving the program code associated with the group of tasks.

10. The method of claim 8, further comprising:
determining information associated with program code that, when executed, causes the final ordinary evaluation task to be performed; and
where sending the information associated with performing the final ordinary evaluation task comprises:
   sending the information associated with the program code.

11. The method of claim 8, further comprising:
receiving a result associated with performing the final ordinary evaluation task; and
updating a display screen, associated with the group of tasks, based on the result associated with performing the final ordinary evaluation task.

12. The method of claim 8, where determining that the final ordinary evaluation task is to be performed comprises:
determining that the final ordinary evaluation task has not been performed by any worker device, included in the pool of worker devices, and that all preceding ordinary evaluation tasks, included in the plurality of ordinary evaluation tasks, have been performed; and
determining that the final ordinary evaluation task is to be performed based on determining that the final ordinary evaluation task has not been performed by any worker device and that all preceding ordinary evaluation tasks have been performed.

13. The method of claim 8, further comprising:
executing program code while waiting for a result of performing the final ordinary evaluation task.

14. The method of claim 8, where the group of tasks is associated with iterations of a parallel loop included in program code.

15. A device, comprising:
one or more processors to:
   identify a group of tasks to be performed by a pool of worker devices,
      the group of tasks including a state manipulation task to be performed by every worker device, included in the pool of worker devices, to modify a state of every worker device, and
      the group of tasks including a plurality of ordinary evaluation tasks,
      each ordinary evaluation task, included in the plurality of ordinary evaluation tasks, to be performed by a single worker device included in the pool of worker devices;
   identify an order associated with performing the group of tasks,
      the order indicating that the plurality of ordinary evaluation tasks are to be performed before the state manipulation task;
   determine that a final ordinary evaluation task, included in the plurality of ordinary evaluation tasks, is to be performed by a worker device included in the pool of worker devices,
      the determination being based on the order and information associated with performing at least one other ordinary evaluation task included in the plurality of ordinary evaluation tasks;
   send, to the worker device, information associated with performing the final ordinary evaluation task; and
   send, to another worker device included in the pool of worker devices, information associated with performing the state manipulation task based on sending the information associated with performing the final ordinary evaluation task and before receiving an indication that the final ordinary evaluation task has been performed by the worker device.

16. The device of claim 15, where the one or more processors are further to:
receive, via user input, program code associated with the group of tasks that are to be performed by the pool of worker devices; and
where the one or more processors, when identifying the group of tasks, are to:
   identify the group of tasks based on receiving the program code associated with the group of tasks.

17. The device of claim 15, where the one or more processors are further to:
determine information associated with program code that, when executed, causes the final ordinary evaluation task to be performed; and
where the one or more processors, when sending the information associated with performing the final ordinary evaluation task, are to:
   send the information associated with the program code.

18. The device of claim 15, where the one or more processors are further to:
receive a result associated with performing the final ordinary evaluation task; and
update a display screen, associated with the group of tasks, based on the result associated with performing the final ordinary evaluation task.

19. The device of claim 15, where the one or more processors, when determining that the final ordinary evaluation task is to be performed, are to:
determine that the final ordinary evaluation task has not been performed by any worker device, included in the pool of worker devices, and that all preceding ordinary evaluation tasks, included in the plurality of ordinary evaluation tasks, have been performed; and
determine that the final ordinary evaluation task is to be performed based on determining that the final ordinary evaluation task has not been performed by any worker device and that all preceding ordinary evaluation tasks have been performed.

20. The device of claim 15, where the one or more processors are to:
execute program code while waiting for a result of performing the final ordinary evaluation task.

\* \* \* \* \*